United States Patent
Golosky

(10) Patent No.: US 11,149,896 B2
(45) Date of Patent: Oct. 19, 2021

(54) PIPELINE PIG WRAP AND BATH

(71) Applicant: Destiny Golosky, Fort McMurray (CA)

(72) Inventor: Destiny Golosky, Fort McMurray (CA)

(*) Notice: Subject to any disclaimer, the term of this patent is extended or adjusted under 35 U.S.C. 154(b) by 0 days.

(21) Appl. No.: 16/811,431

(22) Filed: Mar. 6, 2020

(65) Prior Publication Data

US 2020/0284391 A1 Sep. 10, 2020

(30) Foreign Application Priority Data

Mar. 7, 2019 (CA) ................................ CA 3036022

(51) Int. Cl.
| F16L 55/30 | (2006.01) |
| F16L 55/46 | (2006.01) |
| B08B 3/02 | (2006.01) |
| B08B 3/04 | (2006.01) |
| B08B 3/10 | (2006.01) |

(52) U.S. Cl.
CPC ............... *F16L 55/46* (2013.01); *B08B 3/02* (2013.01); *B08B 3/04* (2013.01); *B08B 3/10* (2013.01); *B08B 3/102* (2013.01); *F16L 55/30* (2013.01)

(58) Field of Classification Search
CPC .. F16L 55/30; F16L 55/46; B08B 3/02; B08B 3/102; B08B 3/04; B08B 3/10
See application file for complete search history.

(56) References Cited

U.S. PATENT DOCUMENTS

| 1,290,405 | A | | 1/1919 | Suter | |
| 3,303,525 | A | * | 2/1967 | Peoples | F16L 55/46 |
| | | | | | 15/104.062 |
| 5,027,466 | A | | 7/1991 | Crawford | |
| 5,891,260 | A | | 4/1999 | Streets et al. | |
| 6,454,492 | B1 | * | 9/2002 | Dean | B08B 9/0551 |
| | | | | | 15/104.5 |
| 7,588,644 | B1 | | 9/2009 | Olivier | |
| 8,713,741 | B2 | * | 5/2014 | Fjerdingstad | B08B 9/02 |
| | | | | | 15/104.062 |
| 8,794,456 | B2 | | 8/2014 | Olivier | |
| 9,664,329 | B2 | | 5/2017 | Hofer et al. | |
| 9,873,138 | B2 | * | 1/2018 | Eck | B08B 9/08 |
| 2011/0120499 | A1 | | 5/2011 | Pruett et al. | |
| 2014/0332031 | A1 | | 11/2014 | Leggett | |

OTHER PUBLICATIONS

Pipeline Dust Bags, Inline Services Inc. https://www.inlineservices.com/product/dust-bags/, (2017).

* cited by examiner

*Primary Examiner* — Randall E Chin

(74) *Attorney, Agent, or Firm* — Finch & Maloney, PLLC; Michael J. Bujold; Jay S. Franklin

(57) ABSTRACT

A pig wrap has an elongated non-permeable wrap and a holding ring. The elongated non-permeable wrap has a first end that is closed and a second end that is attached to the holding ring. The holding ring retains the elongated non-permeable wrap in such a manner that the elongated non-permeable wrap is capable of encompassing a pipeline pig as it passes through the holding ring. The holding ring is positionable at an exit of a pig trap or launcher.

18 Claims, 5 Drawing Sheets

PIPELINE PIG WRAP AND BATH

FIELD OF THE DISCLOSURE

The present application relates generally to pipeline pig wrap and bath.

BACKGROUND

This section provides background information to facilitate a better understanding of the various aspects of the invention. It should be understood that the statements in this section of this document are to be read in this light, and not as admissions of prior art.

Pipeline pigs are used on a regular basis for various purposes in a pipeline, including cleaning and inspecting in a number of different industries. The pigs are generally reusable, however often need to be cleaned between uses. When a pipeline pig is removed from a pig trap or launcher, it often carries product with it. This product can contaminate the surrounding area and any areas in which the pipeline pig travels. After cleaning and during storage, the pipeline pig may also be contaminated with materials that could contaminate products within the pipeline during use. Preventing contamination and limiting the potential contamination of both the products and the surrounding environment are important.

BRIEF SUMMARY

There is provided a pipeline pig wrap that has an elongated non-permeable wrap and a holding ring. The elongated non-permeable wrap has a first end and a second end. The first end of the elongated non-permeable wrap is closed and the second end of the elongated non-permeable wrap is attached to the holding ring. The holding ring is positionable at a pipeline pig exit. The holding ring retains the elongated non-permeable wrap in such a manner that the elongated non-permeable wrap is capable of encompassing a pipeline pig passing through the holding ring.

In one embodiment, a connecting hook aperture for permitting access to the pipeline pig for the purpose of connecting a cable or chain to the pipeline pig is provided.

In one embodiment, the elongated non-permeable wrap is made of plastic or rubber. The elongated non-permeable wrap may be made of other suitable materials.

In one embodiment, a locking mechanism is provided for attaching the holding ring to the exit of a pig trap. The locking mechanism may be a locking mechanism and a locking plate. The locking mechanism has a locking pin biased into a locking position by a spring. The locking plate has an aperture through which the locking pin may pass. The locking pin is moveable between a locking position in which the locking pin extends through the aperture of the locking plate and an unlocking position in which the locking pin does not extend through the aperture of the locking plate.

There is also provided a pipeline pig wash that has a cleaning chamber, a pipeline pig support, a washing mechanism, a collection tray and a wrap holder. The cleaning chamber has a hollow interior and at least one closable aperture for entry and exit of a pipeline pig. The pipeline pig support is positioned within the hollow interior of the cleaning chamber for supporting the pipeline pig during washing by the washing mechanism. The collection tray is provided for collecting materials washed from the pipeline pig. The wrap holder is positioned at an exterior of the at least one closable aperture for entry and exit of the pipeline pig. The wrap holder holds an elongated non-permeable wrap for encompassing a washed pipeline pig. The elongated non-permeable wrap has a first end and a second end. The first end of the elongated non-permeable wrap is closed and the second end of the non-permeable wrap is attached to the holding ring.

In one embodiment, the washing mechanism may be a soaker tank into which a cleaning solution is held. The cleaning chamber could act as the soaker tank.

In another embodiment, the washing mechanism may be an agitator. The agitator causes movement of the pipeline pig within the cleaning chamber and a cleaning solution. The agitator may be movable by a hand turn or any other suitable method known by a person skilled in the art.

In another embodiment, the washing mechanism is a pressure wash system. The pressure wash system utilizes high pressure solution through nozzles or sprayers to remove material from the pipeline pig.

In one embodiment, the elongated non-permeable wrap is made of plastic or rubber. The elongated non-permeable wrap may be made of other suitable materials.

In one embodiment, the wrap holder is removably attached adjacent the at least one closable aperture for entry and exit of the pipeline pig by a locking mechanism. The locking mechanism be a locking mechanism and a locking plate. The locking mechanism has a locking pin biased into a locking position by a spring. The locking plate has an aperture through which the locking pin may pass. The locking pin is moveable between a locking position in which the locking pin extends through the aperture of the locking plate and an unlocking position in which the locking pin does not extend through the aperture of the locking plate. The locking mechanism may be any other method known to a person skilled in the art.

In one embodiment, the cleaning chamber is heated.

In one embodiment, a connecting hook aperture for permitting access to the pipeline pig for the purpose of connecting a cable or chain to the pipeline pig is provided.

BRIEF DESCRIPTION OF THE DRAWINGS

These and other features will become more apparent from the following description in which references are made to the following drawings, in which numerical references denote like parts. The drawings are for the purpose of illustration only and are not intended to in any way limit the scope of the invention to the particular embodiments shown.

DETAILED DESCRIPTION OF THE PREFERRED EMBODIMENTS

Figure 1:
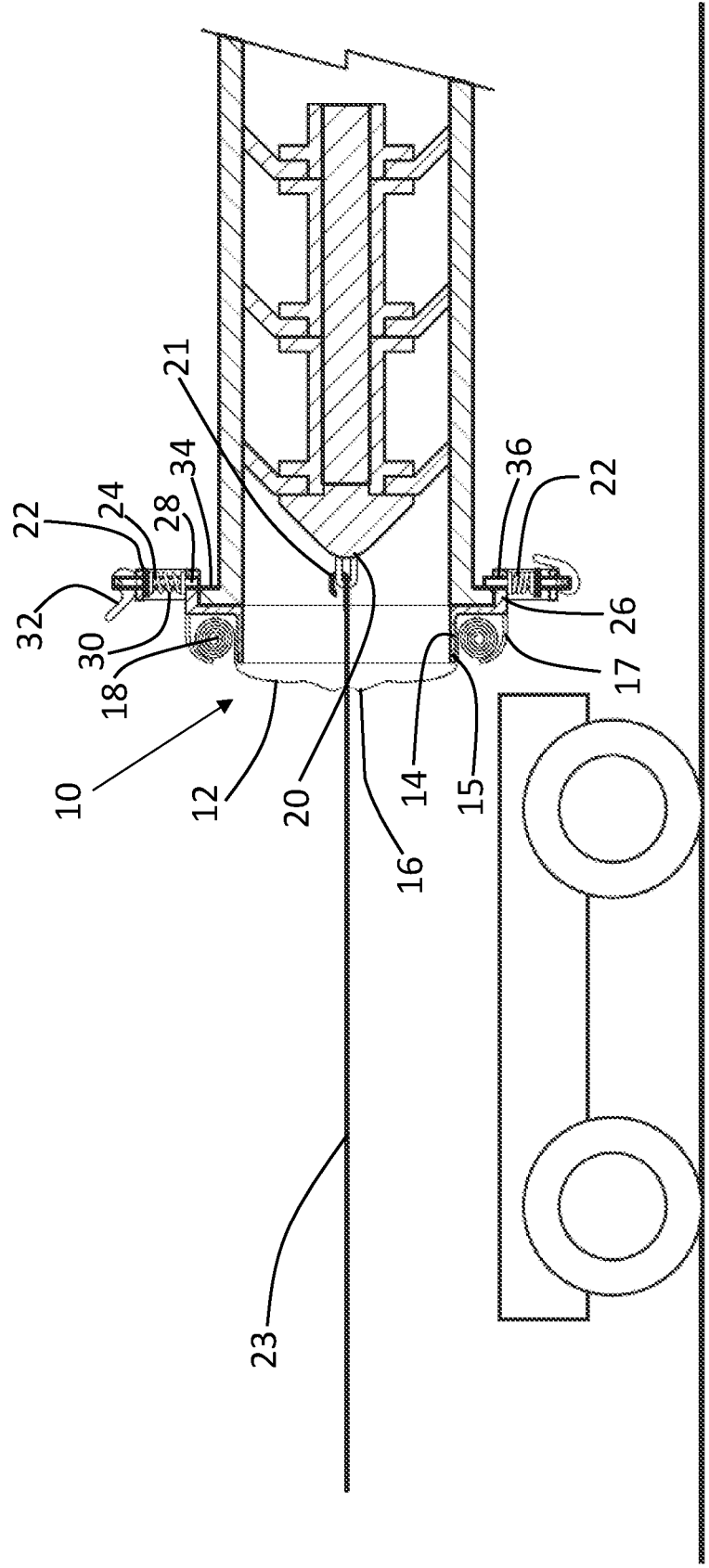
FIG. 1 is a side elevation view, partially in section, of a pig receiver with a pipeline pig wrap attached and a carrying wagon.

A pipeline pig wrap, generally identified by reference numeral 10, will be described with reference to FIG. 1 through FIG. 3. A pipeline pig wash, generally identified by reference numeral 100, will be described with reference to FIG. 4 through FIG. 5.

Figure 2:
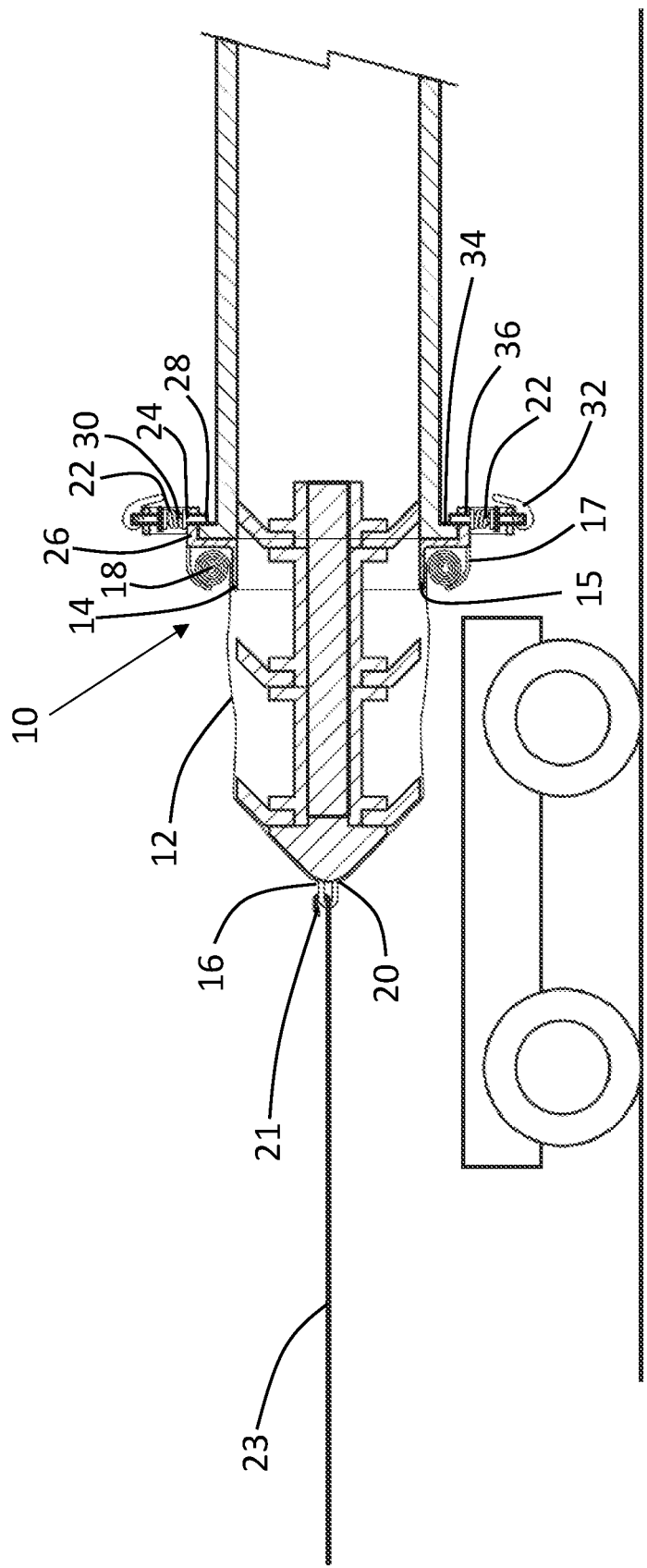
FIG. 2 is a side elevation view, partially in section, of the pipeline pig being removed from the pig receiver through the pipeline pig wrap.

Referring to FIG. 1, a pipeline pig wrap 10 has an elongated non-permeable wrap 12 and a holding ring 14. Elongated non-permeable wrap 12 has a first end 16 and a second end 18. First end 16 is closed to create a closed sleeve into which a pipeline pig may be contained. It will be understood by a person skilled in the art that first end 16 may be closed by any means. This may include using ties, clamps or other devices to close first end 16, may include means for fusing the material at first end 16 to create a closed sleeve or may be the result of any other method known to a person skilled in the art. Non-permeable wrap 12 may be made of plastic, rubber or any other suitable material known to a person skilled in the art. The type of material that is used may be different based upon the type of product through which the pipeline pig has been used. Holding ring 14 is positionable at a pipeline pig exit such as at the exit of a pig trap or launcher. Second end 18 of elongated non-permeable wrap 12 is retained in holding ring 14 in such a manner that elongated non-permeable wrap is capable of encompassing a pipeline pig passing through holding ring 14. Referring to FIG. 2, holding ring 14 has an inner wall 15 and an outer guide 17. Elongated non-permeable wrap 12 is wound within inner wall 15 and outer guide 17 such that it is easily unrolled around pipeline pig as it is removed from the pipeline pig trap or receiver. Outer guide 17 prevents elongated non-permeable wrap 12 from being unintentionally dislodged from holding ring 14.

Figure 4:
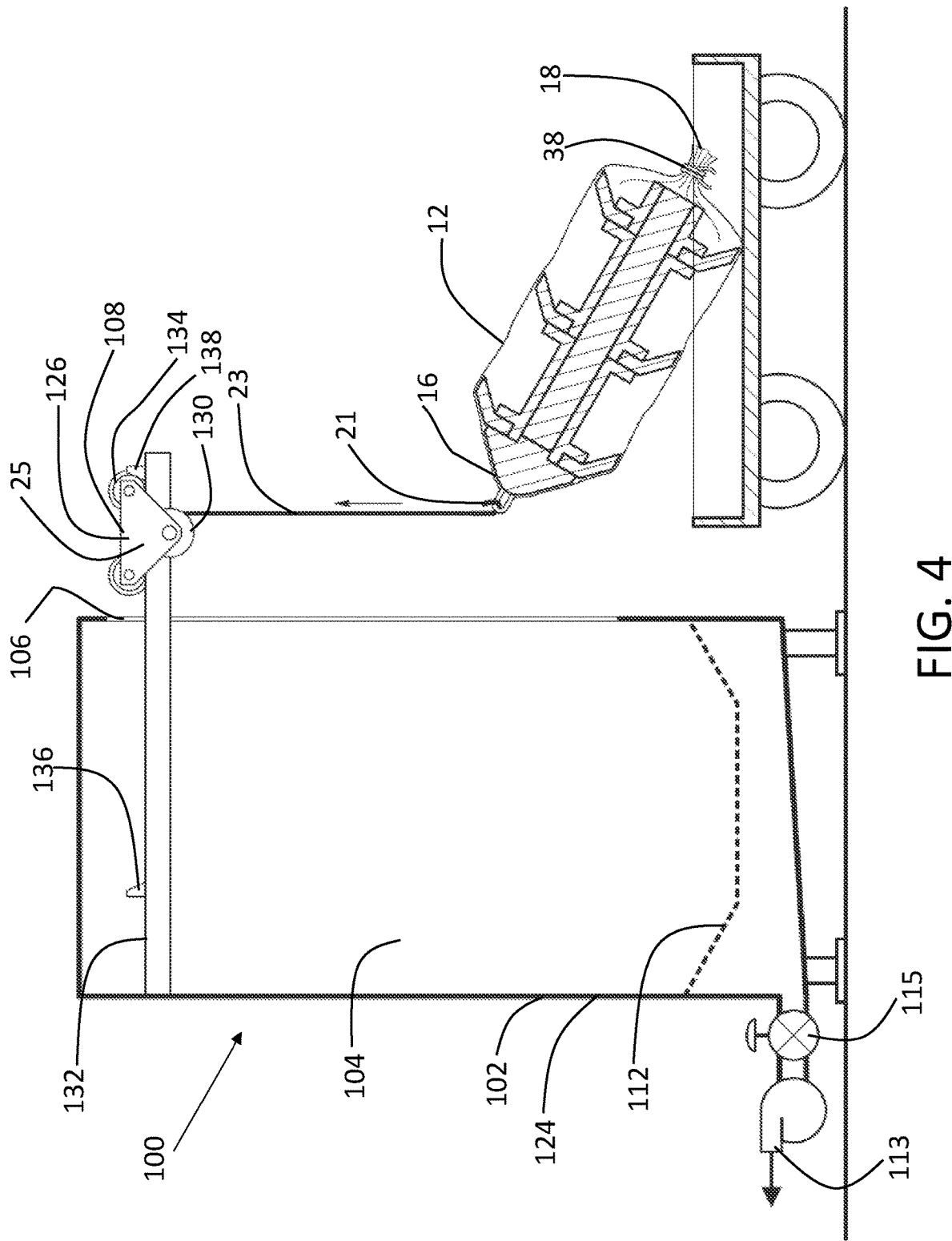
FIG. 4 is a side elevation view, partially in section, of the pipeline pig being placed into a pipeline pig wash.

Referring to FIG. 1 and FIG. 2, pipeline pig wrap 10 may have a connecting hook aperture 20 at first end 16 of elongated non-permeable wrap 12 to allow a connecting hook 21 to be connected to the pipeline pig. Connecting hook 21 may be used for connecting cables 23 to pipeline pig to assist in the removal of pipeline pig from pipeline pig trap or receiver or for moving pipeline pig to and from pipeline pig wash 100. Referring to FIG. 4, connecting hook 21 may be connected by a cable or chain 23 to a pulley system 25 which may be used to move pipeline pig into and out of pipeline pig wash 100.

A holding mechanism 22 may be used to removably attach holding ring 14 to an exit of a pig trap, launcher, receiver or pig wash. In the embodiment shown in FIG. 2 and FIG. 3, holding mechanism 22 comprises a locking mechanism 24 and a locking plate 26. Locking mechanism 24 has a locking pin 28 biased into a locking position by a spring 30. Locking pin 28 is moveable between a locking position and an unlocked position by a lever 32. In the embodiment shown in FIG. 2 and FIG. 3, locking plate 26 abuts against a shoulder 34 of pipeline pig exit and has an aperture 36 through which locking pin 28 may pass. In the locking position, shown in FIG. 3, locking pin 28 extends beyond locking plate 26 and contacts a portion of shoulder 34 of pipeline pig exit to clamp holding ring 14 to pipeline pig exit. In the unlocked position, in the top holding mechanism 22, locking pin 28 remains out of contact with shoulder 34. Locking pins 28 should be in the unlocked position for attaching or removing holding ring 14 to an exit of a pig trap or launcher and are moved to the locking position to clamp holding ring 14 in position for use of pipeline pig wrap 10. It will be understood that different types of holding mechanisms known to a person skilled in the art may be used. This includes, but is not limited to, fasteners such as screws, tape or twine, hooks or other suitable devices.

Figure 3:
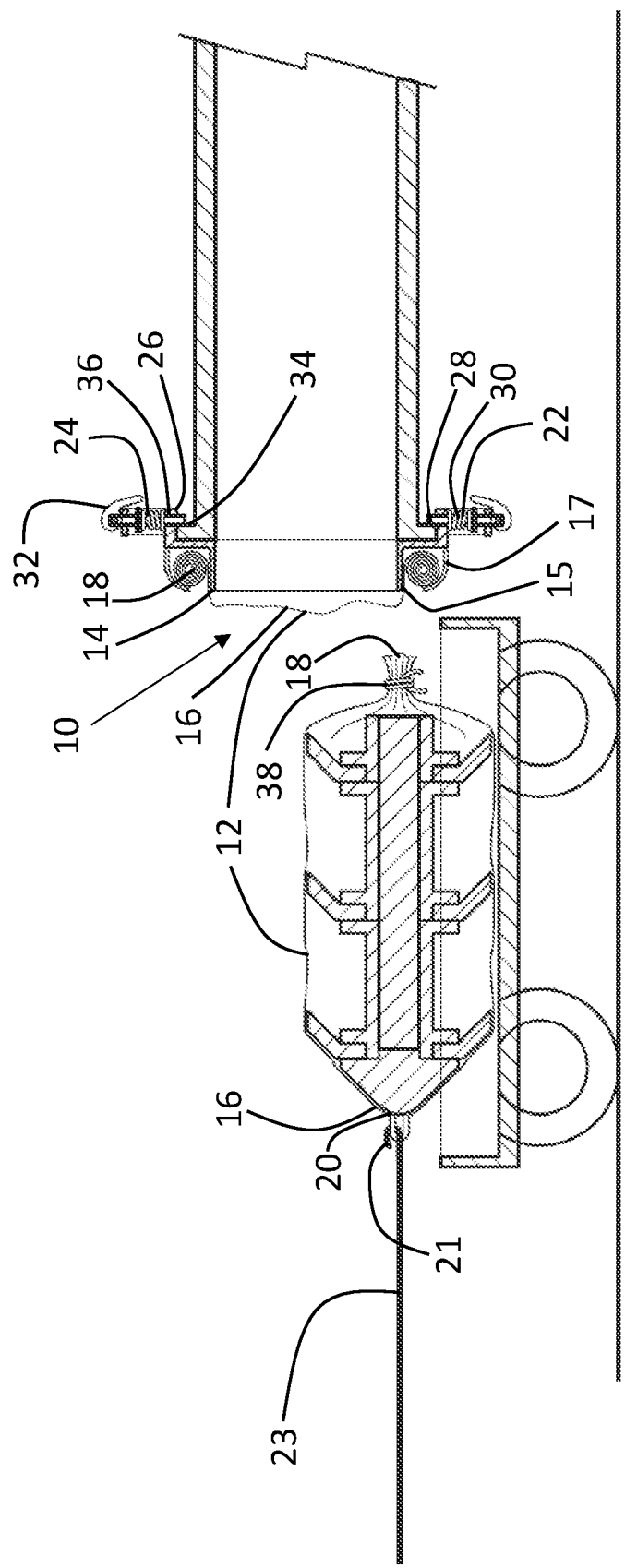
FIG. 3 is a side elevation view, partially in section, of the pipeline pig wrapped in the elongated non-permeable wrap and placed on the carrying wagon for transport.

Referring to FIG. 3, after a pipeline pig is removed from a pip trap or receiver into elongated non-permeable wrap 12, second end 18 may be closed to prevent fluids and other material from exiting elongated non-permeable wrap 12. This allows a pipeline pig to be transferred from one location to another while limiting the fluids and materials within elongated non-permeable wrap 12 from contaminating the environment and users. Second end 18 of non-permeable wrap 12 may be closed by any means known to a person skilled in the art, including but not limited to clamps, string, twine, or tape. In the embodiment shown, twine 38 is used to tie second end 18 of non-permeable wrap 12 closed.

Figure 5:
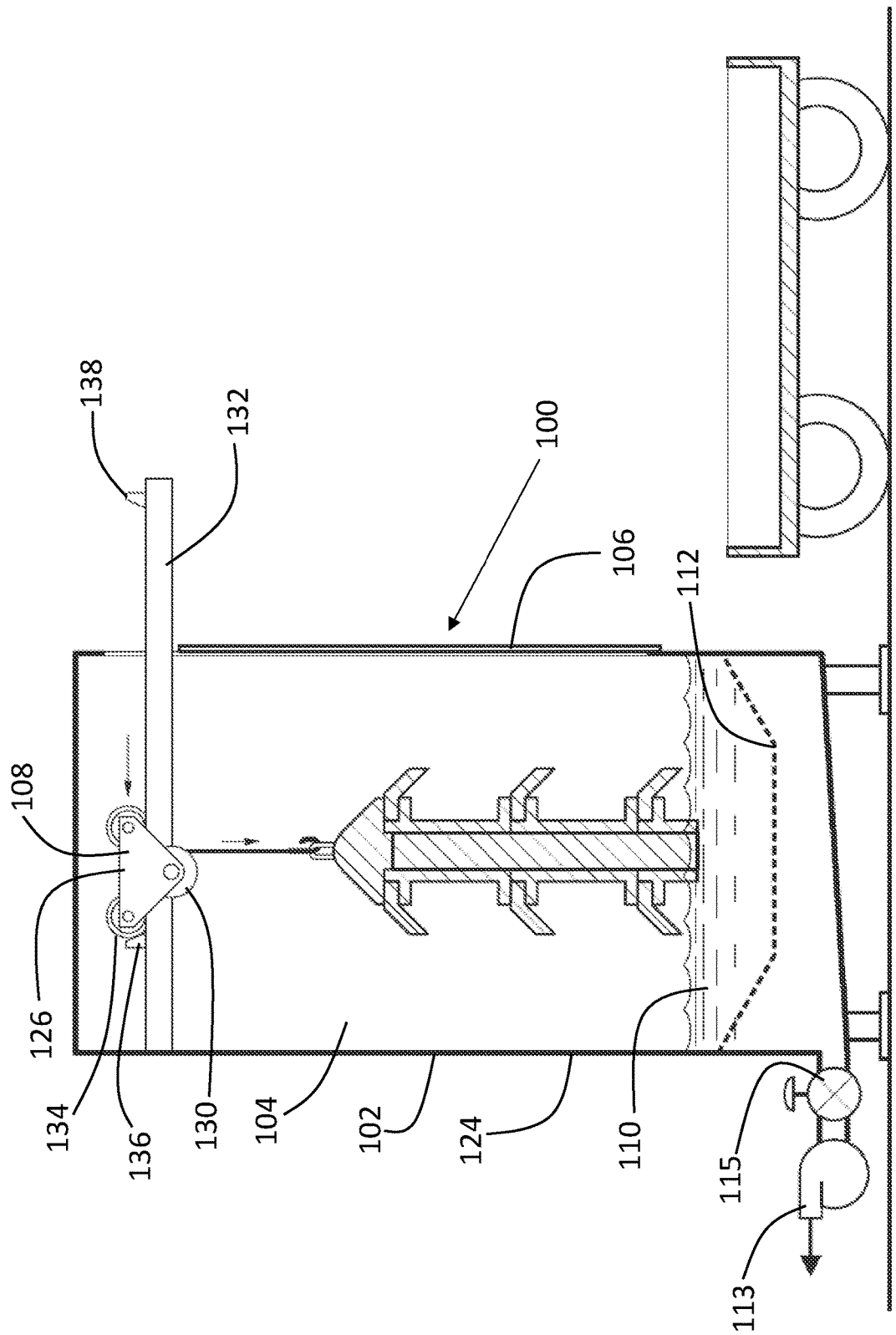
FIG. 5 is a side elevation view, partially in section, of the pipeline pig in the pipeline pig wash.

Referring to FIG. 4, a pipeline pig wash 100 is used for the cleaning of pipeline pigs before and after use. A cleaning chamber 102 is provided into which a pipeline pig may be placed. Cleaning chamber 102 has a hollow interior 104 and at least one closable aperture 106 for entry and exit of the pipeline pig. It will be understood by a person skilled in the art that a single closable aperture 106 may be used for the purpose of placing the pipeline pig and removing the pipeline pig from cleaning chamber 102 or that separate closable apertures 106 may be used for placing the pipeline pig in cleaning chamber 102 and removing pipeline pig from cleaning chamber 102, respectively. A pipeline pig support 108 is positioned within hollow interior 104 of cleaning chamber 102 for supporting a pipeline pig. In the embodiment shown, pipeline pig support 108 is a pulley 130 movable along a track 132 by wheels 134. Pulley 130 suspends the pipeline pig within hollow interior 104 of cleaning chamber 102, however it will be understood that different types of supports may be used. Track 132 has a stop 136 to position the pipeline pig at a generally central location within cleaning chamber 102 and a stop 138 for preventing pulley 130 from sliding off the end of track 132. Referring to FIG. 5, a washing mechanism 110 is provided for washing a pipeline pig. A collection tray 112 is provided for collecting materials washed from the pipeline pig. Materials washed from the pipeline pig can be removed from collection tray 112 in such a manner as contamination of the environment is limited. Pipeline pig wash 100 has a drain 113 through which fluids may be removed from pipeline pig wash 100. A filter 115 is positioned anterior to drain 113 to catch materials not collected by collection tray 112. Fluids removed from pipeline pig wash 100 may be reused or disposed of as needed. While not shown, it will be understood by a person skilled in the art that wrap holder 10 may be positioned at an exterior of closable aperture 106 for the exit of the pipeline pig. Non-permeable wrap 12 may be used to encompass a washed pipeline pig.

Washing mechanism 110 may take many different forms. In the embodiment shown in FIG. 5, washing mechanism 110 is a soaker tank 124 in which a cleaning solution is held. Washing mechanism 110 may include an agitator 126 that causes movement of a pipeline pig within cleaning chamber 102 and a cleaning solution. In the embodiment shown, pipeline pig support 108 acts as agitator 126 with the ability to move the pipeline pig up and down and side to side. Movement may occur through manual or automated methods of moving agitator 126. It will be understood that agitator 126 may be incorporated with soaker tank 124 for improved cleaning capabilities. It will be understood that washing mechanism 110 may also be a pressure wash system that utilizes high pressure solution through nozzles or sprayers to remove material from a pipeline pig. A heater may also be provided for heating cleaning chamber 102. Heater may be an electrical heater, however, it will be understood that different types of heaters may be used.

Any use herein of any terms describing an interaction between elements is not meant to limit the interaction to direct interaction between the subject elements, and may also include indirect interaction between the elements such as through secondary or intermediary structure unless specifically stated otherwise.

In this patent document, the word "comprising" is used in its non-limiting sense to mean that items following the word are included, but items not specifically mentioned are not excluded. A reference to an element by the indefinite article "a" does not exclude the possibility that more than one of the element is present, unless the context clearly requires that there be one and only one of the elements.

It will be apparent that changes may be made to the illustrative embodiments, while falling within the scope of the invention. As such, the scope of the following claims should not be limited by the preferred embodiments set forth in the examples and drawings described above, but should be given the broadest interpretation consistent with the description as a whole.

What is claimed is:

1. A pig wrap, comprising:
    an elongated non-permeable wrap having a first end and a second end, the first end of the elongated non-permeable wrap being closed; and
    a holding ring positionable at a pipeline pig exit, the holding ring having an inner wall and an outer guide, the second end of the elongated non-permeable wrap being attached to the holding ring, the elongated non-permeable wrap being wound within the inner wall and the outer guide such that the elongated non-permeable wrap is unrolled around the pipeline pig as the pipeline pig passes through the holding ring.

2. The pig wrap of claim 1 further comprising a connecting hook aperture for permitting access to the pipeline pig for the purpose of connecting a cable or chain to the pipeline pig.

3. The pig wrap of claim 1 wherein the elongated non-permeable wrap is made of plastic.

4. The pig wrap of claim 1 wherein the elongated non-permeable wrap is made of rubber.

5. The pig wrap of claim 1 further comprising a holding mechanism for attaching the holding ring to the pipeline pig exit.

6. The pig wrap of claim 5 wherein the holding mechanism comprises a locking mechanism and a locking plate, the locking mechanism having a locking pin biased into a locking position by a spring, the locking plate having an aperture through which the locking pin may pass, the locking pin being moveable between a locking position in which the locking pin extends through the aperture of the locking plate and an unlocking position in which the locking pin does not extend through the aperture of the locking plate.

7. A pig wash, comprising:
    a cleaning chamber having a hollow interior, at least one closable aperture for entry and exit of a pipeline pig;
    a pipeline pig support positioned within the hollow interior of the cleaning chamber for supporting the pipeline pig;
    a washing mechanism for washing the pipeline pig;
    a collection tray for the collection of materials washed from the pipeline pig; and
    a wrap holder at an exterior of the at least one closable aperture for entry and exit of a pipeline pig for holding an elongated non-permeable wrap for encompassing a washed pipeline pig, the elongated non-permeable wrap having a first end and a second end, the first end of the elongated non-permeable wrap being closed and the second end of the non-permeable wrap being attached to the wrap holder.

8. The pig wash of claim 7 wherein the washing mechanism is a soaker tank in which a cleaning solution is held.

9. The pig wash of claim 7 wherein the washing mechanism is an agitator, the agitator causing movement of the pipeline pig within the cleaning chamber and a cleaning solution.

10. The pig wash of claim 9 wherein the agitator is movable by a hand turn.

11. The pig wash of claim 7 wherein the washing mechanism is a pressure wash system.

12. The pig wash of claim 7 wherein the elongated non-permeable wrap is made of plastic.

13. The pig wash of claim 7 wherein the elongated non-permeable wrap is made of rubber.

14. The pig wash of claim 7 wherein the wrap holder is removably attached to the at least one closable aperture for entry and exit of a pipeline pig of the cleaning chamber by a holding mechanism.

15. The pig wash of claim 14 wherein the holding mechanism comprises a locking mechanism and a locking plate, the locking mechanism having a locking pin biased into a locking position by a spring, the locking plate having an aperture through which the locking pin may pass, the locking pin being moveable between a locking position in which the locking pin extends through the aperture of the locking plate and an unlocking position in which the locking pin does not extend through the aperture of the locking plate.

16. The pig wash of claim 7 wherein the cleaning chamber is heated.

17. The pig wash of claim 7 wherein the elongated non-permeable wrap has a connecting hook for connecting the elongated non-permeable wrap to the pipeline pig.

18. A pig wrap, comprising:
    an elongated non-permeable wrap having a first end and a second end, the first end of the elongated non-permeable wrap being closed; and
    a holding ring positionable at a pipeline pig exit, the second end of the elongated non-permeable wrap being attached to the holding ring, the holding ring retaining the elongated non-permeable wrap in such a manner that the elongated non-permeable wrap being capable of encompassing a pipeline pig passing through the holding ring; and
    a connecting hook aperture for permitting access to the pipeline pig for the purpose of connecting a cable or chain to the pipeline pig.

* * * * *